Figure 3:
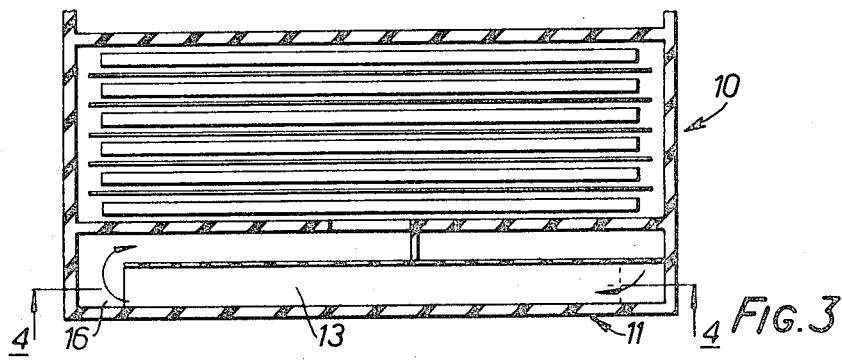

United States Patent

[11] 3,622,395

| [72] | Inventors | Charles James Bushrod<br>Manchester;<br>Patrick Ewart McKellen, Manchester; Eric<br>W. E. Micklethwait, London, all of England |
|---|---|---|
| [21] | Appl. No. | 864,393 |
| [22] | Filed | Oct. 7, 1969 |
| [45] | Patented | Nov. 23, 1971 |
| [73] | Assignee | Electric Power Storage Limited<br>Clifton Junction, Swinton, Manchester,<br>England |
| [32] | Priority | Oct. 10, 1968 |
| [33] | | Great Britain |
| [31] | | 48,132/68 |

[54] ELECTRIC STORAGE BATTERY TOPPING UP MEANS
7 Claims, 6 Drawing Figs.

[52] U.S. Cl. .................................................. 136/162, 136/166

[51] Int. Cl. .................................................. H01m 7/00
[50] Field of Search .................................................. 136/162, 159, 166

[56] References Cited
UNITED STATES PATENTS

| 1,991,604 | 2/1935 | Drabia .................... | 136/162 |
| 2,527,209 | 10/1950 | Bischoff .................... | 136/162 |

FOREIGN PATENTS

| 1,142,010 | 2/1969 | Great Britain ............... | 136/162 |

Primary Examiner—Donald L. Walton
Attorney—Watson, Cole, Grindle & Watson

ABSTRACT: A topping up device for an electric storage battery comprises a series of ramps, or an inclined pipe, for automatically topping up the cells by raising liquid from a reservoir alongside the cells when the battery is accelerated.

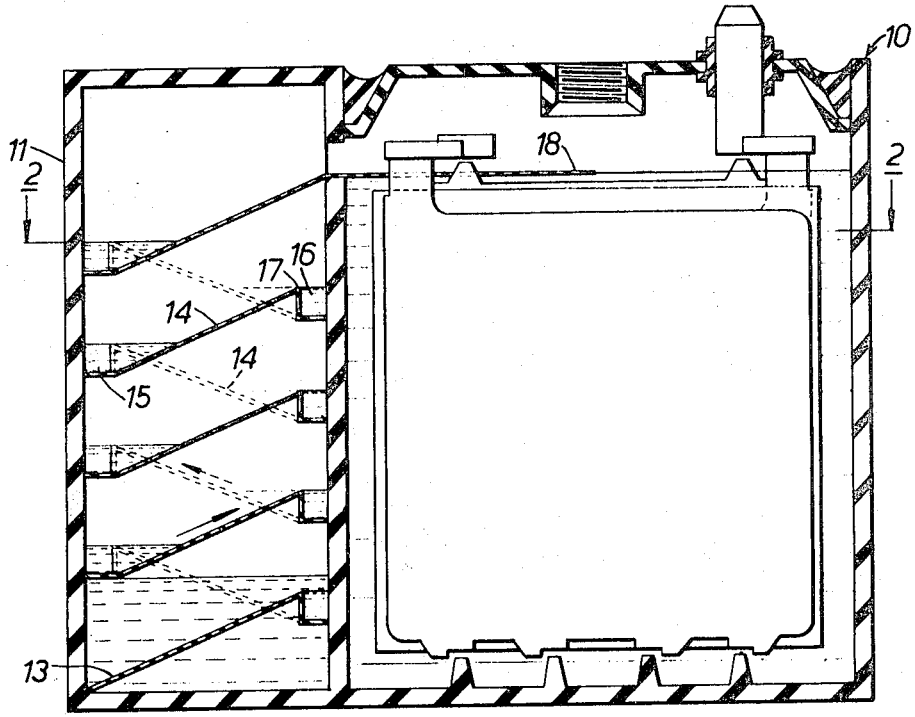
FIG. I.
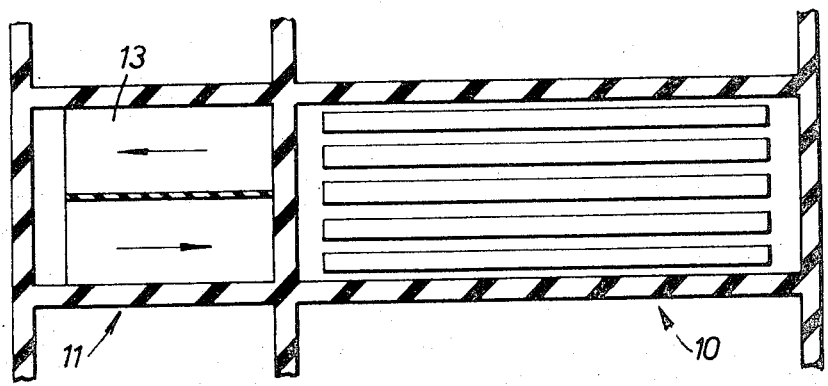
FIG. 2.

PATENTED NOV 23 1971 3,622,395

SHEET 2 OF 2

INVENTORS
CHARLES J. BUSHROD
PATRICK E. McKELLN
ERIC W. E. MICKLETHWAITE
BY
Watson, Cole, Grindle & Watson
ATTORNEY

ELECTRIC STORAGE BATTERY TOPPING UP MEANS

This invention relates to electric storage battery topping up means intended for use in vehicles, ships or the like.

According to the present invention an electric storage battery includes means for automatically topping up the level of electrolyte including a reservoir for topping up liquid situated below the level of the top of the plates and pumping means for raising the liquid to feed it into the cells operated automatically by acceleration or tilting of the battery. Thus the pumping means may be operated by speeding up, slowing down, or cornering by ascending or descending hills.

The pumping mean may deliver liquid into a high-level reservoir or manifold situated above the liquid flow in the battery, liquid-level control means being provided for controlling the flow of liquid under gravity from the manifold into each cell in accordance with the level of liquid in the cell.

In a specific form of the invention the pumping means comprises a pump, which will be termed a fish-ladder pump, having at least one sloping ramp extending from a lower pool to an upper pool and inclined to the horizontal at such an angle that acceleration or tilting of the battery in a certain direction, such as would be encountered during normal use of a vehicle, will cause the liquid to travel up the ramp into the pool at the top of it. The device may include a series of ramps conveniently sloping upwards in opposite directions so that the upper pool of one ramp constitutes the lower pool of the next ramp. Thus acceleration in one direction will cause liquid to flow up all the ramps extending in one direction and acceleration in the opposite direction will cause liquid to flow up all the other ramps.

Recent developments in automobile engineering are tending to restrict the available height of starter batteries while allowing fairly generous plan dimensions. At the same time there is a requirement for low-maintenance batteries, requiring less frequent topping up by addition of water. Loss of liquid from an ordinary lead-acid cell is mainly be electrolysis and partly by evaporation, but in either one the loss is a loss of water and results in an increase in the concentration in the electrolyte which is restored by the addition of distilled water.

If requirements permit a substantial head space above the plates an excess of electrolyte can be provided so that a given loss of electrolyte will not actually expose the plates, although it will result in undesirable increase of concentration. If excess electrolyte cannot be provided above the plates, even if it is provided at the side, loss of electrolyte will result in actually exposing the upper part of the plates, which is undesirable.

The topping up liquid in the reservoir may be electrolyte of normal concentration, distilled water, or a more dilute electrolyte. Thus in a simple arrangement with which the contents of the reservoir may mix with the electrolyte in the cell the latter would generally be unduly diluted if distilled water were used in the reservoir, whereas the increase of concentration due to evaporation or electrolysis can be tolerated. In an arrangement in which mixing is prevented it will generally be preferred to employ distilled water.

The present invention provides automatic topping up in a particularly simple manner without requiring any separate pump or external source of power, and employing pumping means having no moving parts.

Figure 4:
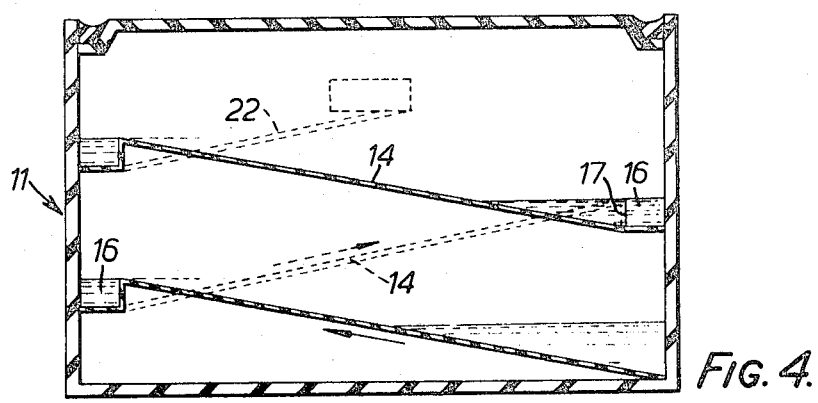
Figure 5:
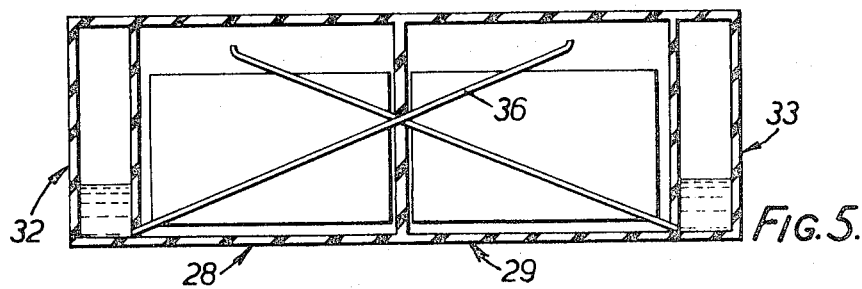
Figure 6:
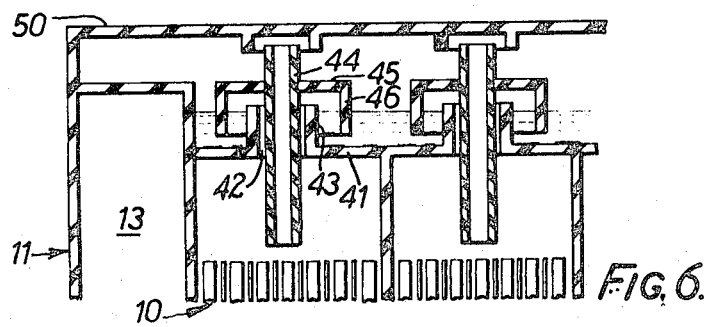

The invention may be put into practice in various ways but certain specific embodiments will be described by way of example with reference to the accompanying diagrammatic drawings in which:

FIG. 1 is a side sectional elevation of a battery cell incorporating a fish-ladder pump, FIG. 2 is a plan view on line 2—2 of FIG. 1, FIG. 3 is a diagrammatic plan view of cell in which the fish-ladder pump is situated at the side of the cell, FIG. 4 is a side elevation of the fish-ladder pump on the line 4—4 of FIG. 3, FIG. 5 is a diagrammatic elevation of two cells with crossover fish-ladder pipes, and FIG. 6 shows a level-control device incorporating a liquid trap.

In one simple construction shown in FIGS. 1 and 2 each cell 10 of a lead acid starter battery, for use in a motor vehicle, has alongside it a reservoir compartment which in plan view is somewhat long and narrow. The reservoir compartment contains what may be termed a fish-ladder pump 13 comprising a series of ramps 14 each sloping up from a lower pool 15 at one end to an upper pool 16 at the other end. Alternate ramps extend in opposite directions and the upper pool of the ramp is common to the lower pool of the mext ramp. Each ramp 14 slopes up at an angle of perhaps 20° to the horizontal so that when it is accelerated towards its lower pool at a corresponding rate liquid from the lower pool will travel up the ramp and pour over a slight step 17 into the upper pool. The, when the vehicle accelerates in the opposite direction, it will travel up the next ramp into the upper pool of that ramp, thereby progressively rising from the bottom to the top of the reservoir 11 if necessary.

In the simple arrangement being described each cell is provided with a separate reservoir and the liquid from the uppermost ramp flows directly into the cell, over an inner cover 18 extending to about the middle of the cell so as to prevent return of liquid from the cell to the ramps 14. Thus during use of the vehicle liquid is continuously being fed from the reservoir into the cell and overflowing back again from the cell into the reservoir. As liquid evaporates or is electrolyzed, the liquid level in the reservoir falls progressively but due to the action of the fish-ladder pump the cell is kept full and the loss of liquid is confined to the reservoir.

The reservoir and cell may be arranged end to end as described above or it may be preferable to arrange them side by side as shown in FIGS. 3 and 4 and to make the top ramp 22 only half the length of the reservoir so as to terminate in the middle, thereby minimizing the tendency for electrolyte to return from the cell to the reservoir due to acceleration of the cell in a direction away from the reservoir.

Thus in any arrangement in which the pumping means delivers liquid directly into the cell it may be desirable that it should open into the cell in the region of the middle of the liquid surface in it, so that acceleration or tilting will not cause liquid to return from the cell to the reservoir except when the cell is overfull.

The multistage fish-ladder pump may then in some circumstances be replaced by a single stage pump. Alternatively or in addition the ramps described may be replaced by closed pipes.

Thus in a further simple arrangement shown in FIG. 5 two cells 28 and 29 are mounted end to end in line with two reservoirs 32 and 33. A pipe 36 slopes up from the bottom of reservoir 32 and opens upwards at the middle of the liquid surface in the cell 29. Each of the other reservoirs is similarly connected to a cell, so that the each reservoir is spaced horizontally form its cell by an intervening cell. Each of the cells 28 and 29 may be one of a row of cells.

Thus a moderate acceleration or tilt will cause liquid to flow from a reservoir to a cell, but a reverse acceleration or tilt will hardly affect the level at the center of the cell and will, therefore, not cause a return flow, unless the static level is above the top of the pipe.

The arrangements described have substantially the same effect as providing a reserve of electrolyte in a large head space above the plates without the additional height that this involves. Like such an arrangement they have the disadvantage that the concentration of the electrolyte will increase as liquid is lost and replaced by further electrolyte.

In a modification of the second arrangement the reservoir 11 is filled with distilled water and a liquid level control device is interposed between the uppermost ramp and the inlet to the cell. The liquid-level control device may be of any known type, of which there are many, for example incorporating a float or one relying on a venting tube which is closed when the level in the cell rises above the desired level so as to prevent air from being discharged. Examples of such devices are described in British Pat. Nos. 1,099,741, 1,142,010 and 1,201,766, and an example of a suitable liquid control device is shown in FIG. 6.

The liquid control device shown in FIG. 6 comprises a liquid chamber 41 which has in its bottom a central hole 42 from which a filling tube 43 projects upwards. A vent tube 44 extends coaxially through the filling tube so as to leave an annular space for liquid to flow down. The filing tube is provided with a cap 45 and skirt 46 to provide a liquid trap.

In this case, instead of providing a separate reservoir with a separate fish-ladder pump for each cell, a single reservoir 11 and pump 13 may be employed for the complete battery to feed water into a common manifold 50, which extends transversely across all the cells of the battery, from which it is admitted to each cell through a separate liquid level control device. In this case, since distilled water is supplied from and there is no mixing of the electrolyte in the cells with the water in the reservoir, the concentration of the electrolyte in the cells can remain substantially constant.

The arrangements described enable the frequency of topping up to be greatly reduced, even though the height of the battery is severely restricted. They involve no external pumps, valves, or other apparatus, being completely self contained, the pumping being effected without recourse to any moving parts.

What we claim as our invention and desire to secure by Letters Patent is:

1. An electric storage battery including means for automatically topping up the level of electrolyte including a reservoir for topping up liquid situated below the level of the top of the plates and pumping means for raising the liquid to feed in into the cells operated automatically by acceleration or tilting of the battery.

2. A battery as claimed in claim 1 in which the pumping means delivers liquid into a high-level reservoir or manifold situated above the liquid level in the battery, liquid-level control means being provided for controlling the flow of liquid under gravity from the mainfold into each cell in accordance with the level of liquids in the cell.

3. A battery as claimed in claim 1 in which the pumping means comprises a pump, which will be termed a fish-ladder pump, having at least one sloping ramp extending from a lower pool to an upper pool and inclined to the horizontal at such an angle that acceleration or tilting of the battery in a certain direction, such as would be encountered during normal use of a vehicle, will cause the liquid to travel up the ramps into the pool at the top of it.

4. A battery as claimed in claim 3 in which the fish-ladder pump includes a series of ramps conveniently sloping upwards in opposite directions so that the upper pool of one ramp constitutes the lower pool of the next ramp, such that the acceleration, of the vehicle, in one direction will cause liquid to flow up all the ramps extending in one direction and acceleration in the opposite direction will cause liquid to flow up all the other ramps.

5. A battery as claimed in claim 1 in which the pumping means comprises a pipe sloping up from a reservoir to the top of a cell, so that the acceleration, of the vehicle, will cause liquid to flow up the pipe.

6. A battery as claimed in claim 4 in which the top ramp is arranged to terminate in the middle of the cell.

7. A battery as claimed in claim 5 in which the pipe is arranged to terminate in the middle of the cell.

* * * * *